United States Patent
Berger

[15] 3,680,020
[45] July 25, 1972

[54] FOR THE THERMOSTATIC REGULATION OF ROOM TEMPERATURES

[72] Inventor: Hans Berger, Schonaich, Germany
[73] Assignee: Zentra Albert Burkle Kommanditgesellschaft, Schonaich, Germany
[22] Filed: March 31, 1970
[21] Appl. No.: 24,176

[30] Foreign Application Priority Data

March 31, 1969 Austria .................4A3178/69

[52] U.S. Cl..............................337/305, 337/361
[51] Int. Cl...............H01h 37/04, H01h 37/20, H01h 37/52
[58] Field of Search................................236/46; 337/301–305, 361

[56] References Cited

UNITED STATES PATENTS

| | | | |
|---|---|---|---|
| 2,311,236 | 2/1943 | Kucera | 236/46 E |
| 2,246,186 | 6/1941 | Prince | 236/46 R |
| 2,345,981 | 4/1944 | Kronmiller | 236/46 R |
| 2,419,077 | 4/1947 | Isserstedt | 236/46 R |
| 2,549,461 | 4/1951 | Haller | 236/46 D X |

FOREIGN PATENTS OR APPLICATIONS 1,134,758 11/1968 Great Britain.................337/305

Primary Examiner—Bernard A. Gilheany
Assistant Examiner—Dewitt M. Morgan
Attorney—Edwin E. Greigg

[57] ABSTRACT

In an apparatus for the control of temperature, a continuously rotating contour disc causes a bimetallic element to execute a slow oscillating motion for alternately turning on and off a switch operatively connected to a heat generating device. The complemental lengths of one off- and one on-period which together constitute a cycle of constant duration, depend upon an arbitrary positioning of the bimetallic element (setting of the desired temperature value) and upon the temperature-responsive deformation (actual temperature value) of the bimetallic element.

14 Claims, 3 Drawing Figures

PATENTED JUL 25 1972
3,680,020
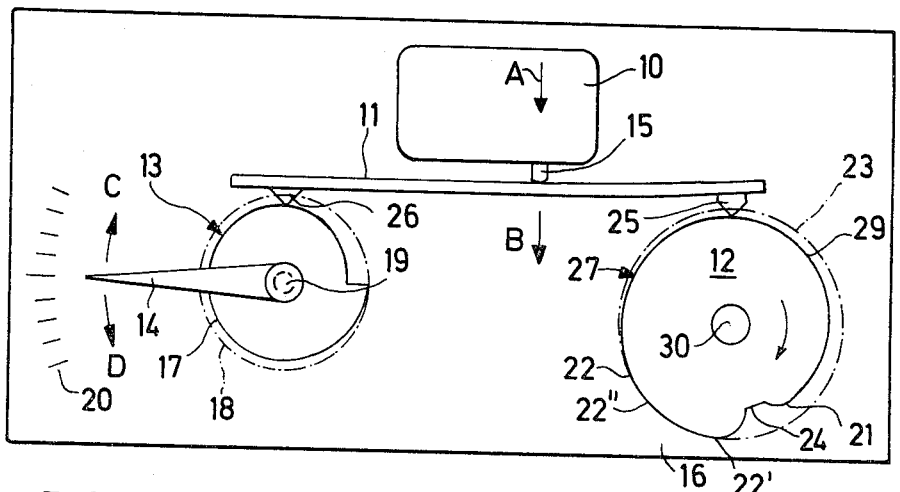
FIG. 1
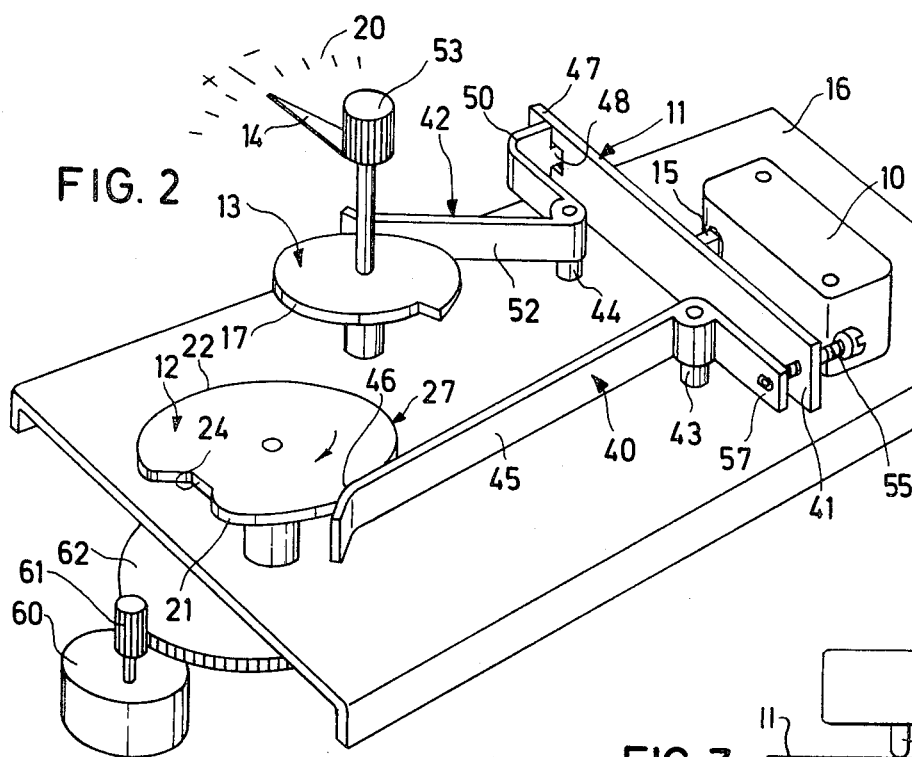
FIG. 2
FIG. 3
INVENTOR.
Hans Berger
BY
Edwin E. Greigg

FOR THE THERMOSTATIC REGULATION OF ROOM TEMPERATURES

BACKGROUND OF THE INVENTION

This invention relates to a method of and an apparatus for regulating the room temperature of buildings or the like. The apparatus, with which the invention is concerned, is of the type that includes a bimetallic sensor located in the room and responsive to room temperatures and a switching device having at least one switch for emitting command signals upon actuation by said sensor.

It is known to regulate room temperatures by means of two-position thermostats wherein a bimetallic element sets a conventional switch into either an on- or an off-position for controlling the temperature. It is a disadvantage of such arrangements that the switch hystereses adversely affect the accuracy of the temperature control and, as a result, there are often substantial deviations between the desired and the actual room temperatures. It is a further disadvantage of the known two-position regulating devices of this type that they change signals only in response to temperatures that exceed or fall below a determined value or range. In this manner undesired strong fluctuations in the room temperature may occur.

OBJECT AND SUMMARY OF THE INVENTION

It is an object of the invention to provide an improved temperature control method and apparatus which are simple, operationally safe and, being free from the aforenoted disadvantages, ensure a more accurate room temperature regulation.

Briefly stated, according to the invention, a two-position switch is alternately turned on and off in successive cycles. Each cycle is of identical, constant duration and is formed by one off- and a successive on-period. The length of an off-period and an on-period within a cycle is arbitrarily set according to the desired temperature and is automatically adjusted by a bimetallic element responsive to the actual room temperature.

For performing the aforeoutlined method, according to the invention, there is provided a two-position switch turned on and off by a bimetallic element formed as a leaf spring, the mid portion of which engages the switch-actuating button. One end of the bimetallic element is moved alternately towards and away from said switch by means of a mechanism driven at constant speed, setting said switch into alternating off- and on-positions. The other end of said bimetallic element is arbitrarily adjustable with respect to the switch to set the desired room temperature. The complemental lengths of the on- and off-periods of the switch within one cycle are affected by said arbitrary adjustment and by the deformation of said bimetallic element.

The invention will be better understood as well as further objects and advantages of the invention will become more apparent from the ensuing detailed specification of a preferred, although exemplary embodiment, of the invention taken in conjunction with the drawing.

BRIEF DESCRIPTION OF THE DRAWING

FIG. 1 is a schematic plan view of a two-position temperature regulating apparatus according to the preferred embodiment of the invention;

FIG. 2 is a perspective view of the same embodiment including minor practical modifications and FIG. 3 is a fragmentary schematic plan view of another embodiment of the invention.

DESCRIPTION OF THE EMBODIMENTS

Turning now to FIG. 1, the room temperature regulating apparatus shown therein includes a microswitch 10, a bimetallic bar 11 formed as a bimetallic leaf spring, a contour disc 12 serving as a first point of engagement for the bimetallic element 11 and rotated at a uniform speed by a motor (not shown in FIG. 1), a stationary, although arbitrarily turnable contour disc 13 serving as a second point of engagement for the bimetallic element 11. A pointer 14, affixed to contour disc 13, indicates the setting thereof. The bimetallic element 11 is thus engaged at one end by the stationary, but adjustable contour disc 13 and at the other end by the contour disc 12. A third point of engagement for the bimetallic element 11, approximately midway between the first and second locations of engagement, is provided by the actuator button 15 of the microswitch 10.

The microswitch 10 may assume two switching positions dependent upon whether the actuating button 15 is depressed or released. In general, a first switching position corresponds to an off-condition, whereas a second switching position corresponds to an on-condition. The microswitch 10 is fixedly attached to a mounting plate 16 which also carries the contour discs 12 and 13. To the underside of the mounting plate 16, there is secured a driving means of uniform speed, not shown in FIG. 1.

The contour disc 13 with which the desired temperature is set, has a curved periphery 17 shaped as an archimedean spiral. For a better illustration of the course of periphery 17, there is shown, in dash-dotted line, a circumscribed circle 18. The contour disc 13 is turnable manually about its shaft 19 against the force of a frictional brake, not shown. The latter prevents an accidental rotation of the disc 13 from its position corresponding to the desired temperature value. The position of the contour disc 13 is indicated by the pointer 14 on a scale 20 which may be calibrated in terms of temperatures or any other value. The operation of contour disc 13 will become more apparent as the specification progresses.

The contour disc 12 has a periphery in the shape of a closed curve generally indicated at 27 which, between the locations 21 and 22, has a continuously rising course 29 formed as an archimedean spiral. The curve 27 includes a concave depressed portion 24, the depth of which is so designed that under normal operating conditions, as the follower pin 25 of the bimetallic leaf spring 11 falls thereinto, the switch 10, overcoming its unavoidable hysteresis, assumes its first, or off-position. In the range 22″ (between the locations 22 and 22′) the curve 27 is circular in shape coinciding with the circumscribed circle 23 shown in dash-dot lines. The purpose of said circular portion of range 22″ is to ensure a minimum period of the second, or on-position of switch 10 during the rotation of the contour disc 12 if, during such a rotation a second, or on-position is at all obtained. The switching from the first or off-position to the second or on-position is dependent upon the temperature sensed by the bimetallic leaf spring 11, that is, it is dependent upon the temperature-responsive bending deformation of the bimetallic leaf spring 11. Thus, the switch 10 is set to its second or on-position as a function of the own temperature of the bimetallic element 11. Such switching occurs at different angular positions of the contour disc 12, when the follower pin 25 is between locations 24 and 22.

The bimetallic leaf spring 11 is continuously urged into contact with contour discs 12 and 13 in the direction of arrow A by means of the spring-loaded actuator button 15 of switch 10. The bimetallic leaf spring 11 is held against displacement in an axial direction or in a direction normal to the plane of the drawing by guiding means, not shown. The latter do in no way interfere with the aforenoted temperature-responsive deformation and displacements of the bimetallic element 11 necessary for operating the actuator button 15.

By virtue of the aforedescribed cooperation between the microswitch 10 and the spiral range 29 of the contour disc 12, this temperature regulating apparatus operates as a two-position temperature control system with proportional characteristic (P-behavior). For this reason alone it effects a substantially improved regulation over the conventional two-position temperature regulators which operate without a proportional behavior. The aforedescribed apparatus further represents an improvement over the conventional devices insofar that the switching hysteresis present during the switching from the second or on-position to the first or off-position, has no effect since the resetting of the switch 10 by virtue of the follower pin 25 falling into the depression 24, occurs independently of the switching hysteresis always in the same angular position of the contour disc 12. In this manner the accuracy of the regulation is further improved.

OPERATION OF THE PREFERRED EMBODIMENT

The contour disc 12, continuously or intermittently driven with a constant rpm (for example, a fraction of one revolution per minute), causes the end of the bimetallic element 11 carrying the follower pin 25 to perform an oscillating motion normal to its length dimension.

One revolution or cycle of the contour disc 12 will now be described.

When, during the rotation of the contour disc 12, the follower pin 25 rapidly drops into the depression 24, the bimetallic element 11 quickly moves away from switch 10 in the direction of arrow B. This permits the operator button 15 to suddenly assume its extreme released position. This occurrence causes switch 10 to be set into its first, or off-position. By virtue of the sudden movement of operator button 15 into its aforenoted extreme position, the switching into said off-position is performed by overcoming the switching hystereses. It is to be noted that a switching operation as set forth hereinabove will not take place if the switch is already in its off-position, a condition to be described hereinafter.

As the contour disc 12 continues to rotate, the follower pin 25 rapidly rises from the depression 24 and then travels on the spiral range 29, first passing over location 21 which is the closest point of curve portion 29 to the center of the contour disc 12. As the latter continues to rotate, the follower pin 25 (travelling now on curve portion 29), by virtue of the continuously and uniformly increasing distance between the points on the curve and the shaft 30, slowly and with the constant speed moves opposite the direction indicated by arrow B. As a result, the actuator button 15 is moved inwardly against the force of a spring, not shown. Thus, the follower pin 25 will reach one point on the curve portion 29 wherein the actuator button 15 causes the switch 10 to be set into its second, or on-position. This energizes a heat generating device (such as a heating pump, a burner, or the like) for increasing the room temperature.

As the follower pin 25 is rapidly brought out from the depression 24, the bimetallic element 11 and the operator button 15 are quickly moved from their extreme position to an intermediate position. From the latter, the operator button is brought slowly into its other extreme position in which the switch 10 is set into its second, or on-position. This feature ensures improved regulating characteristics.

Upon further rotation of the contour disc 12, the switch 10 remains in its second switching position until the follower pin 25 again falls into the depression 24 at which moment the switch 10 is set to the first, or off-position, de-energizing the aforenoted heat generating device.

Prior to dropping into the depression 24, the follower pin 25 rides on the circular curve portion 22" that extends between locations 22 and 22'. The points of the circular curve portion 22" are the farthest away from the center of the contour disc 12, and consequently, the operator button 15 is maintained for a certain period (e.g. 3 minutes) in its other (depressed) extreme position. In this manner, during normal operation, a minimum on-period is ensured which is desirable in case of certain heat generating devices.

It is seen that during each revolution (i.e. cycle) of the contour disc 12, the temperature control apparatus is adapted to cause switch 10 to change its position twice. Since the duration of one cycle is always constant and depends only on the rpm of the drive means, the lengths of the off-period and the on-period of each cycle are complemental. The lengths of said periods are affected by the setting of the contour disc 13 (desired temperature) and by the deformation of the bimetallic element 11 (deviation of actual temperature from the desired value).

Assuming that a relatively high room temperature is desired, the contour disc 13 is turned clockwise until the pointer 14, travelling in the direction of arrow C, indicates the desired value on scale 20. Follower pin 26 affixed to an end of bimetallic element 11 then rests on a relatively high point of spiral 17. Thus, the basic position of the bimetallic element 11 for the given desired temperature value is relatively elevated (i.e. relatively close to switch 10). Consequently, the switch 10 will be set to its second, or on-position at a relatively early moment during the travel of follower pin 25 on spiral portion 29 of the contour disc 12. This means that for the aforenoted setting of contour disc 13, during each cycle the duration of the off-period will be relatively short, while the duration of the on-period will be relatively long. It will be apparent that a contrary result is reached if the contour disc 13 is turned in the direction of arrow D.

The effect of the temperature responsive deformation of the bimetallic leaf spring 11 on the lengths of the on- and off-periods will now be described.

The higher the temperature of the bimetallic leaf spring 11, the longer the switch 10 remains in its first or off-position during each cycle. This is because the bimetallic leaf spring 11, as the temperature increases, is deformed in the direction of the arrow B, away from actuator button 15.

If the temperature of the bimetallic leaf spring 11 has reached a predetermined maximum value or exceeds the same, the cycle or cycles during which such condition persists, consist only of an off-period (i.e. first, or off-position of switch 10). Only if the temperature falls below such a value, will the switch 10 again periodically turn on and off. The range of desired temperatures and the proportional range are coordinated in this embodiment in such a manner that in a deviation range that extends from negative to positive values, the switch 10 will change positions during each cycle. It is noted that by deviation there is meant the difference between the desired and the actual value of the room temperature. If, on the other hand, in this embodiment the actual temperature value falls substantially below the desired temperature, a condition may occur when the switch 10 is continuously (throughout an entire cycle or cycles) in its second or on-position. This will be the case when the follower pin 25, as it drops into the depression 24 of the contour disc 12, does not set the switch 10 from its second or on-position into its first or off-position due to the presence of the switching hysteresis. Such a result is advantageous if the actual temperature value falls substantially below the desired value. There is namely achieved a rapid increase in the room temperature, since the heat generating device will be in a continuously energized condition, usually for several revolutions of the contour disc 12. In this embodiment, such a particular condition occurs only for a short period during the starting of a cold heat generating device or in similar conditions, but not during the normal regulation of the room temperatures.

It is thus seen that the aforedescribed method and apparatus effect a timed cyclical control of temperature, providing at the same time a proportional temperature regulation as a function of the desired and the actual temperature values.

DESCRIPTION OF A PRACTICAL MODIFICATION OF THE PREFERRED EMBODIMENT OF THE INVENTION

Turning now to FIG. 2, the mounting plate 16 carries on its upper face the contour discs 12 and 13, the switch 10, the bimetallic leaf spring 11 and two bell-crank type levers generally indicated at 40 and 42. The latter are pivotally attached to respective stationary pins 43 and 44 and serve for transmitting the momentary position of the discs 12 and 13 to the adjacent corresponding ends of the bimetal element 11. The free end 46 of the long arm 45 of the lever 40 serves as a follower and is in contact with the curved track 27 of the contour disc 12. The short arm 57 of the lever 40 is connected with one end 41 of the bimetallic element 11 by means of an adjusting screw 55. The latter is threadedly held in the bimetallic element 11 and is in engagement with the arm 57 with a lateral clearance. By turning the adjusting screw 55, the distance between the bimetallic element 11 and the switch 10 is changed thereby adjusting the lengths of the on- and off-periods. It is seen that arm 45 is substantially longer than arm 57. Thus, the excursions of the lever 40 as described by the terminus 46 of arm 45 are substantially reduced at the free terminus of arm 57. This feature has technological advantages; for example, it permits larger tolerances in the shaping of contour disc 12.

The lever 42 has a long arm 52, the free end of which serves as a follower and is in contact with the curved track 17 of the contour disc 13 rotatable by a knob 53. The short arm 50 of the lever 42 terminates in a tab 48 which extends with a small clearance into an opening provided in the terminus 47 of the bimetallic element 11.

The contour disc 12 is driven with a constant rpm by a driving means 60 such as a synchronous motor through a gear pair 61, 62.

The operation of the embodiment shown in FIG. 2 is the same as that of the embodiment shown in FIG. 1, with the exception that the displacing forces are transmitted from the contour discs 12 and 13 to the bimetallic element 11 not by follower pins 25 and 26 but by means of bell-crank type levers 40 and 42.

It is noted that the setting of contour disc 13 is effected in a direction opposite to that according to FIG. 1, since it is provided with a spiral track 17 having a course opposite to that of the disc 13 of the precedingly described embodiment.

As it may be observed in FIGS. 1 and 2, the bimetallic element 11 is engaged at its ends advantageously in the manner of a flexible beam freely resting on and pivoting about two supports engaging its ends. It will be understood, however, that such engagement of the bimetallic element is in no way limitative and that in some cases, the latter may be rigidly secured at one or both ends to the stationary or continuously oscillating abutment point.

It is within the scope of the invention to include two switches to be actuated by the bimetallic element. This is a particularly advantageous arrangement when the aforedescribed apparatus controls a bi-directional motor associated with mixing valves. Such an arrangement is illustrated in FIG. 3, wherein a second switch 10', 15' is shown opposite the switch 10, 15 at the other side of the bimetallic bar 11. The apparatus which incorporates the second switch 10', 15' may otherwise be identical to that shown in FIG. 1. In such an arrangement one switch is turned on in response to a positive temperature deviation and energizes or de-energizes the motor for rotation in one sense, while the other switch is responsive to a negative temperature deviation and energizes or de-energizes the motor for turning in the other sense.

The invention may further find application in combined heating and air conditioning systems affecting the temperature of a room. In such a case, the apparatus according to the invention may comprise two curved timing discs with associated bimetallic elements and switches operatively connected to said bimetallic elements. Here, one timing disc with its associated bimetallic element and switch controls the air conditioning, while the other timing disc controls the heating.

The driving means of the temperature control apparatus may simultaneously serve to operate other timed devices. Thus, for example, with temperature control systems there are often associated timing devices which, during nighttime, lower the desired room temperature, while during daytime raise the temperature to the required value. In the apparatus according to the invention, a lowering of the nighttime temperature may be achieved in a simple manner by raising the temperature of the bimetallic element by means of a heat source energized at night, thus simulating a higher room temperature. Consequently, the temperature control apparatus will set a room temperature that is correspondingly lower than the temperature to which the room would be heated in the absence of said heat source.

What is claimed is:

1. In an apparatus for thermostatically regulating room temperatures, the improvement comprising,
    A. an electric switch including an operator member movable in an "on" direction and an opposed "off" direction for placing said switch in an "on" and in an "off" condition, respectively,
    B. a bimetallic bar disposed adjacent said switch and having, along its length, a first location for cooperating with said operator member, said first location moving in one or the other said direction as a function of the deformation of said bimetallic bar in response to temperature changes sensed thereby,
    C. support means engaging said bimetallic bar at a second location thereof to provide a stationary pivotal point for said bar, said second location being spaced from said first location,
    D. a rotary contour disc in continuous operative contact with said bimetallic bar at a third location thereof spaced from said second location and
    E. drive means rotating said contour disc for oscillating said bimetallic bar about said pivotal point to cause said first location to periodically and alternately move in one and the other said direction, during each revolution of said contour disc, said switch is being maintained by said bimetallic bar, dependent upon its position, in an "on" and in an "off" position for periods dependent upon the magnitude of deviation of the actual room temperature from the desired room temperature.

2. An apparatus as defined in claim 1, wherein said contour disc is directly connected with said bimetallic bar.

3. An apparatus as defined in claim 1, including movable intermediate means for connecting said contour disc with said bimetallic bar.

4. An apparatus as defined in claim 3, wherein said movable intermediate means includes a lever formed of two arms of unequal length, the longer arm is connected to said contour disc and the shorter arm is connected to said bimetallic bar.

5. An improvement as defined in claim 1, including means to arbitrarily shift said support means for moving said pivotal point substantially parallel to said directions to set a value for said desired room temperature.

6. An improvement as defined in claim 1, wherein said first location of said bimetallic bar is situated between said second and third locations thereof.

7. An apparatus as defined in claim 6, wherein said first location is disposed approximately midway between said second and said third location.

8. An improvement as defined in claim 1, wherein said rotary contour disc includes a spiral cam portion for providing a P-characteristic of said apparatus.

9. An apparatus as defined in claim 8, wherein said cam portion of the contour disc has the course of an archimedean spiral.

10. An improvement as defined in claim 1, wherein said contour disc includes a steep first cam portion for causing a rapid displacement of said bimetallic bar upon each revolution of said contour disc into an extreme position in which said switch assumes one of said conditions, said extreme position of said bimetallic bar is so designed that said switch assumes its last-named condition by overcoming the switching hysteresis of said switch; said contour disc includes a second cam portion operative subsequent to said first cam portion to permit said switch to assume the other of said conditions as a function of the extent of temperature-dependent deformation of said bimetallic bar.

11. An improvement as defined in claim 10, wherein said contour disc includes a steep third cam portion disposed between said first and second cam portions for rapidly moving said bimetallic bar from said extreme position into an intermediate position; said second cam portion moving said bimetallic bar from said intermediate position slowly towards another extreme position opposite to said first-named extreme position.

12. An improvement as defined in claim 11, wherein said contour disc includes a fourth cam portion operative subsequent to said third cam portion and prior to said first cam portion to maintain said bimetallic bar in another extreme position to hold said switch in the other of its conditions for a minimum duration.

13. An apparatus as defined in claim 12, wherein said fourth cam portion is of circular course.

14. An apparatus as defined in claim 1, including two switches associated with said bimetallic bar, one of said last-named switches is closable upon positive temperature deviations, the other of said last-named switches is closable upon negative temperature deviations.

* * * * *